United States Patent
Lee

(10) Patent No.: US 11,145,098 B2
(45) Date of Patent: Oct. 12, 2021

(54) METHOD AND APPARATUS OF SIMULATING APPAREL REFLECTING BINDING

(71) Applicant: CLO Virtual Fashion Inc., Seoul (KR)

(72) Inventor: Ho-Hyun Lee, Seoul (KR)

(73) Assignee: CLO VIRTUAL FASHION INC., Seoul (KR)

( * ) Notice: Subject to any disclaimer, the term of this patent is extended or adjusted under 35 U.S.C. 154(b) by 0 days.

(21) Appl. No.: 16/999,637

(22) Filed: Aug. 21, 2020

(65) Prior Publication Data
US 2021/0056743 A1  Feb. 25, 2021

(30) Foreign Application Priority Data
Aug. 23, 2019 (KR) .................. 10-2019-0103932

(51) Int. Cl.
*G06T 11/60* (2006.01)
*G06K 9/62* (2006.01)
*G06T 19/20* (2011.01)

(52) U.S. Cl.
CPC ............ *G06T 11/60* (2013.01); *G06K 9/6201* (2013.01); *G06T 19/20* (2013.01); *G06T 2210/16* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 8,249,738 B2* | 8/2012 | Lastra | ............... | A41H 3/007 700/132 |
| 8,269,778 B1* | 9/2012 | Baraff | ............... | G06T 13/20 345/473 |
| 9,659,396 B1* | 5/2017 | Chang | ............... | G06T 13/20 |
| 2006/0015208 A1* | 1/2006 | Reyes Moreno | ...... | A41H 3/007 700/132 |
| 2014/0114620 A1* | 4/2014 | Grinspun | ............... | G06T 19/00 703/1 |
| 2018/0012420 A1* | 1/2018 | Ngo Ngoc | ............. | G06T 19/20 |

(Continued)

FOREIGN PATENT DOCUMENTS

KR   10-2017-0068741 A   6/2017

OTHER PUBLICATIONS

Turquin, Emmanuel, et al. "A sketch-based interface for clothing virtual characters." IEEE Computer graphics and applications 27.1 (2007): 72-81.*

(Continued)

*Primary Examiner* — Ryan M Gray
(74) *Attorney, Agent, or Firm* — Fenwick & West LLP

(57) ABSTRACT

According to an embodiment, a method and an apparatus for simulating apparel reflecting binding receive a user input for setting a binding region in clothes draped to a three-dimensional (3D) avatar model, calculating a sum of at least one length corresponding to the binding region in at least one base pattern constituting the clothes, based on the user input, generate a virtual binding pattern combined with the at least one base pattern, based on the sum of the at least one length, and drape the clothes to the 3D avatar model based on the at least one base pattern and the virtual binding pattern.

18 Claims, 11 Drawing Sheets

(56) References Cited

U.S. PATENT DOCUMENTS

| | | | |
|---|---|---|---|
| 2018/0020756 A1* | 1/2018 | Nouais | G06F 30/20 |
| | | | 700/135 |
| 2018/0300959 A1* | 10/2018 | Souza | G06T 17/20 |
| 2019/0272679 A1* | 9/2019 | Brodsky | G06F 30/20 |
| 2019/0376220 A1* | 12/2019 | Tsonis | G05B 15/02 |

OTHER PUBLICATIONS

Sengupta, Sarbartha, and Parag Chaudhuri. "Virtual garment simulation." 2013 Fourth National Conference on Computer Vision, Pattern Recognition, Image Processing and Graphics (NCVPRIPG). IEEE, 2013.*

Berthouzoz, Floraine, et al. "Parsing sewing patterns into 3D garments." Acm Transactions on Graphics (TOG) 32.4 (2013): 1-12.*

CLO Virtual Fashion, "CLO 4.2 Official Release," Sep. 12, 2018, two pages.

CLO Virtual Fashion, "CLO 4.2 Open Beta Test is Updated!," Aug. 23, 2018, three pages.

\* cited by examiner

METHOD AND APPARATUS OF SIMULATING APPAREL REFLECTING BINDING

CROSS-REFERENCE TO RELATED APPLICATION

This application claims the benefit of Republic of Korea Patent Application No. 10-2019-0103932, filed on Aug. 23, 2019, in the Korean Intellectual Property Office, the disclosure of which is incorporated herein by reference.

BACKGROUND

1. Field of the Invention

The disclosure relates simulating apparel with a binding pattern onto a binding area of a base pattern.

2. Description of the Related Art

When a person wears clothes, the clothes are viewed as a three-dimensional object. However, when designing the clothes, they are actually formed of two-dimensional fabric patterns. Because the fabric pattern that becomes part of the clothes is flexible, the appearance of the clothes may change depending on the body shape and movement of the person wearing the clothes. For example, clothes draped on a person may be slid down, wrinkled, or folded due to gravity, wind, or a collision with the person's body. The resulting shape of the clothes may vary depending on the properties of the fabric. Hence, an approach different from modeling rigid objects may be used to three-dimensionally simulate clothes made of flexible materials. To perform a simulation that results in more accurate appearance of the draped clothes, effects of sewing and various supplemental materials may be considered.

SUMMARY

Embodiments relate to simulating apparel by taking into account a virtual binding pattern attached to one or more base patterns. The length of a binding region across one or more base patterns that form the apparel is determined. A digital representation of the apparel is generated. The digital representation has one or more base patterns attached with the virtual binding pattern of a pattern length derived from the determined length of the binding region. The generated digital representation of the apparel is draped onto a three-dimensional (3D) avatar model.

In one or more embodiments, a binding attribute of the binding region is received. The binding attribute includes the length of the binding region.

In one or more embodiments, the binding attribute of the binding region is received via a user input.

In one or more embodiments, the user input indicates a binding start point, a binding end point, and a binding path of the binding region.

In one or more embodiments, the pattern length is determined as a ratio of the length of the binding region.

In one or more embodiments, the pattern length is a function of the length of the binding region and a width of the virtual binding pattern.

In one or more embodiments, the length of the binding region is determined by determining an inner line length of the binding region, determining an outer line length of the binding region as defined by a width of the binding region, and determining the length of the virtual binding pattern as a value between the inner line length and the outer line length.

In one or more embodiments, the length of the virtual binding pattern is determined as a function of a binding length ratio.

In one or more embodiments, the virtual binding pattern is determined by determining an angle of a binding start point of the one or more base patterns as a first angle of one end of the virtual binding pattern, determining an angle of a binding end point of the one or more base patterns as a second of the other end of the virtual binding pattern, and applying the first angle and the second angle to generate the virtual binding pattern.

In one or more embodiments, the virtual binding pattern is generated by determining a length ratio between lengths of binding regions. The virtual binding pattern is attached to the one or more base patterns with the at least one of a starting point and an ending point matching corresponding points of the base pattern in accordance with the length ratio.

In one or more embodiments, a user input defining at least one binding attribute is received. At least one binding attribute is a visual property corresponding to the virtual binding pattern, a physical property of the virtual binding pattern, a direction of a grain line, a binding length ratio, a binding width, or a binding type. The virtual binding pattern is attached to the one or more base pattern according to the at least one binding attribute.

In one or more embodiments, at least one binding attribute comprises a stitch attribute to the binding region.

In one or more embodiments. a modification of the one or more base patterns is received. A modified length of the binding region according to the modification is received. The virtual binding pattern according to the modified length is determined.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
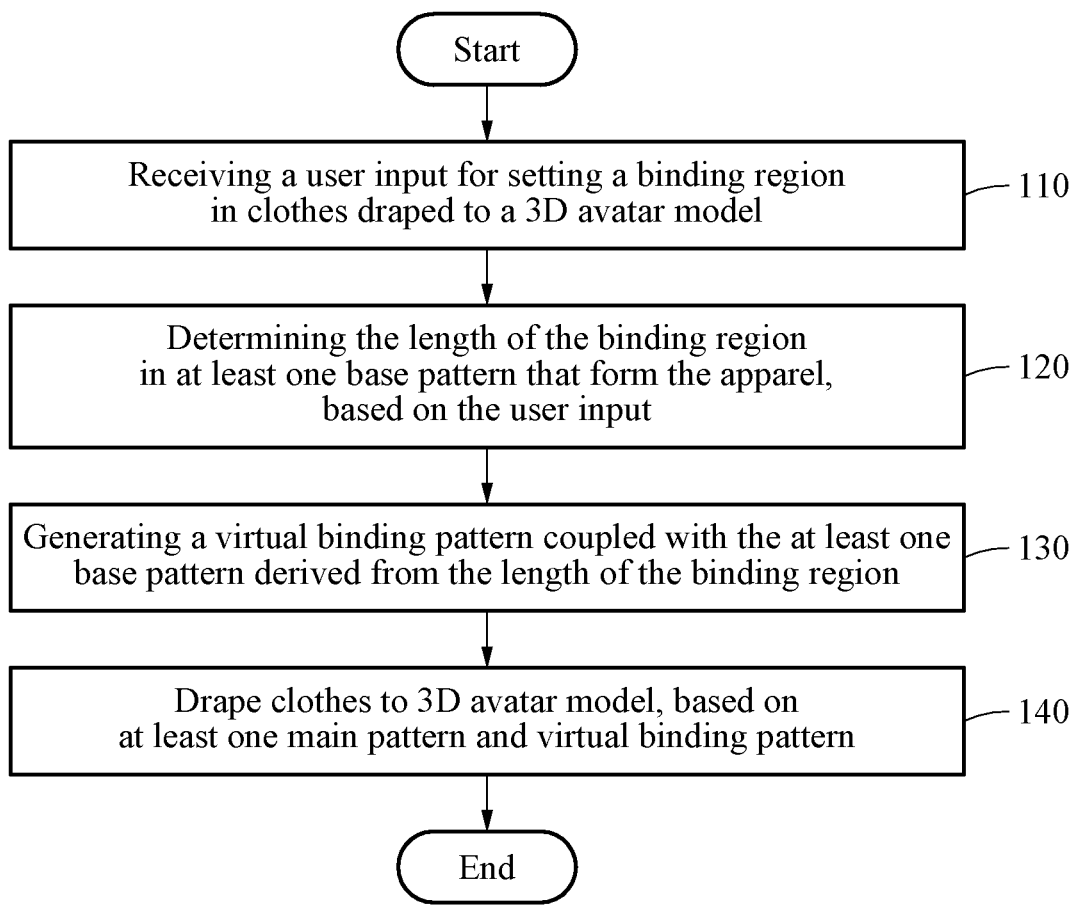
FIG. 1 is a flowchart illustrating a method of simulating apparel reflecting binding, according to an embodiment.

Hereinafter, embodiments of the present invention will be described in detail with reference to accompanying drawings. Various changes may be made to the embodiments, but the scope of the present invention is neither limited nor restricted by the embodiments. It should be understood that all modifications, equivalents, and alternatives for the embodiments are included in the spirit and scope of the present invention.

In the following description with reference to the accompanying drawings, the same reference numerals are assigned to the same components regardless of the reference numerals, and redundant descriptions thereof will be omitted. In the following description of the embodiment, when it is determined that the detailed description of the related well-known technology may obscure the gist of the embodiment unnecessarily, the detailed description thereof will be omitted.

Binding described herein refers to sewing supplemental materials or a seam onto parts of clothing to reinforce stiffness. The types of bindings include, among others, in-binding that invisibly sews fabric from the outside and out-binding or double-sided binding that wraps the end of the seam allowance. For example, the binding region may be set as a line or a surface.

A binding pattern described herein refers to the supplemental materials or the seam that is attached to the parts of the clothing to reinforce stiffness.

Draping described herein refers to attaching a virtual version of 3D clothing object onto the 3D avatar model by combining pattern information or clothes patterns through a computer program.

A base pattern described herein refers to a pattern of a two-dimensional flexible material (e.g., fabric) that can be adjoined to form a three-dimensional apparel. Typically, multiple base patterns are adjoined to form apparel. For example, multiple base patterns may include, for a top portion of apparel, a collar, a sleeve, and key plates (e.g., a front let side, a front right side, and a back key plate). The base pattern may be obtained by simulating a sample pattern tailored to form physical clothes or from virtual 3D clothes, as a 2D object on a computer. The base pattern may be generated by setting the appearance and physical properties of the flexible material.

A binding region described herein refers to one or more portions in one or more base patterns where the binding pattern is attached.

FIG. 1 is a flowchart illustrating a method of simulating apparel reflecting binding, according to an embodiment. Referring to FIG. 1, an apparel simulation apparatus (hereinafter, referred to as a "simulation apparatus") receives 110 a user input for setting a binding region in clothes draped to a 3D avatar model. For example, a user input may correspond to an input for selecting a binding where a binding pattern is to be added to base patterns corresponding of apparel (e.g., clothes) for draping onto the 3D avatar model.

For example, the user input for setting the binding region may be received through a user interface (see a user interface 1110 of FIG. 11) such as a keyboard, a mouse, a touch pen, a stylus pen, or the like. In an embodiment, the binding may be easily added to the corresponding binding region by allowing a user to directly select the binding region to which binding is added. A method of receiving a user input for setting the binding region will be described in detail with reference to FIGS. 2 and 3 below.

The simulation apparatus determines 120 the length of the binding region in at least one base pattern that form the apparel, based on the user input received in operation 110.

The base patterns according to an embodiment may be virtual 2D clothes patterns modeled through triangle meshes for the simulation of 3D virtual clothes. The three vertices of a mesh may be point masses; each side of the mesh may be expressed as springs having elasticity connecting the point masses. As such, for example, the clothes patterns may be modeled by a mass-spring model. Herein, the springs may have each resistance for stretch, shear, and bending depending on the properties of the used fabric. Each vertex may move under the actions of the external force such as gravity and the internal force of stretch, shear, and bending. When the force applied to each vertex is obtained by calculating the external and internal forces, the displacement and the moving speed of each vertex may be obtained. Moreover, the motion of the virtual clothes may be simulated through the motions of the vertices of the mesh at each time step. When 2D virtual clothes patterns made of triangle meshes are draped to the 3D avatar model, natural 3D virtual clothes based on the laws of physics may be realized. Determining of the length of a binding region will be described in detail with reference to FIG. 4 below.

The simulation apparatus generates 130 a virtual binding pattern coupled with the at least one base pattern derived from the length of the binding region calculated in operation 120. The simulation apparatus may calculate a length ratio between a binding region and a length of a corresponding virtual binding pattern to account for the difference in the length of the binding region on the base pattern and the length of the virtual binding pattern. The simulation apparatus may match the virtual binding pattern with the at least one base pattern based on the binding start point of the base pattern so as to be suitable for the length ratio.

For example, it is assumed that the base patterns include a left base pattern of the top, a right base pattern of the top, and a back base pattern of the top. At this time, it may be understood that "matching a virtual binding pattern with at least one base pattern" is dividing and attaching the virtual binding pattern to a left base pattern, a right base pattern of the top or a back base pattern so as to be suitable for the length ratio calculated with respect to the binding region of each of the left base pattern of the top, the right base pattern of the top, and the back base pattern of the top based on a binding start point. For example, the virtual binding pattern may be a rectangular band-shaped pattern, but is not limited thereto. The angle of both ends of the virtual binding pattern may be determined by the angle of the binding start point and the angle of the binding end point of the base pattern. A method in which a simulation apparatus generates a virtual binding pattern will be described in detail with reference to FIGS. 5 and 6 below.

The simulation apparatus drapes 140 clothes to the 3D avatar model, based on the at least one base pattern and the generated virtual binding pattern. Draping of clothes will be described in detail with reference to FIGS. 8 to 10 below.

The method of simulating apparel according to embodiments is advantageous, among other reasons, because binding patterns are automatically generated without a user's manual configuration of the binding patterns, and provide more degrees of freedom of realistic simulation of garment that takes into account various characteristics of the binding materials.

Figure 2:
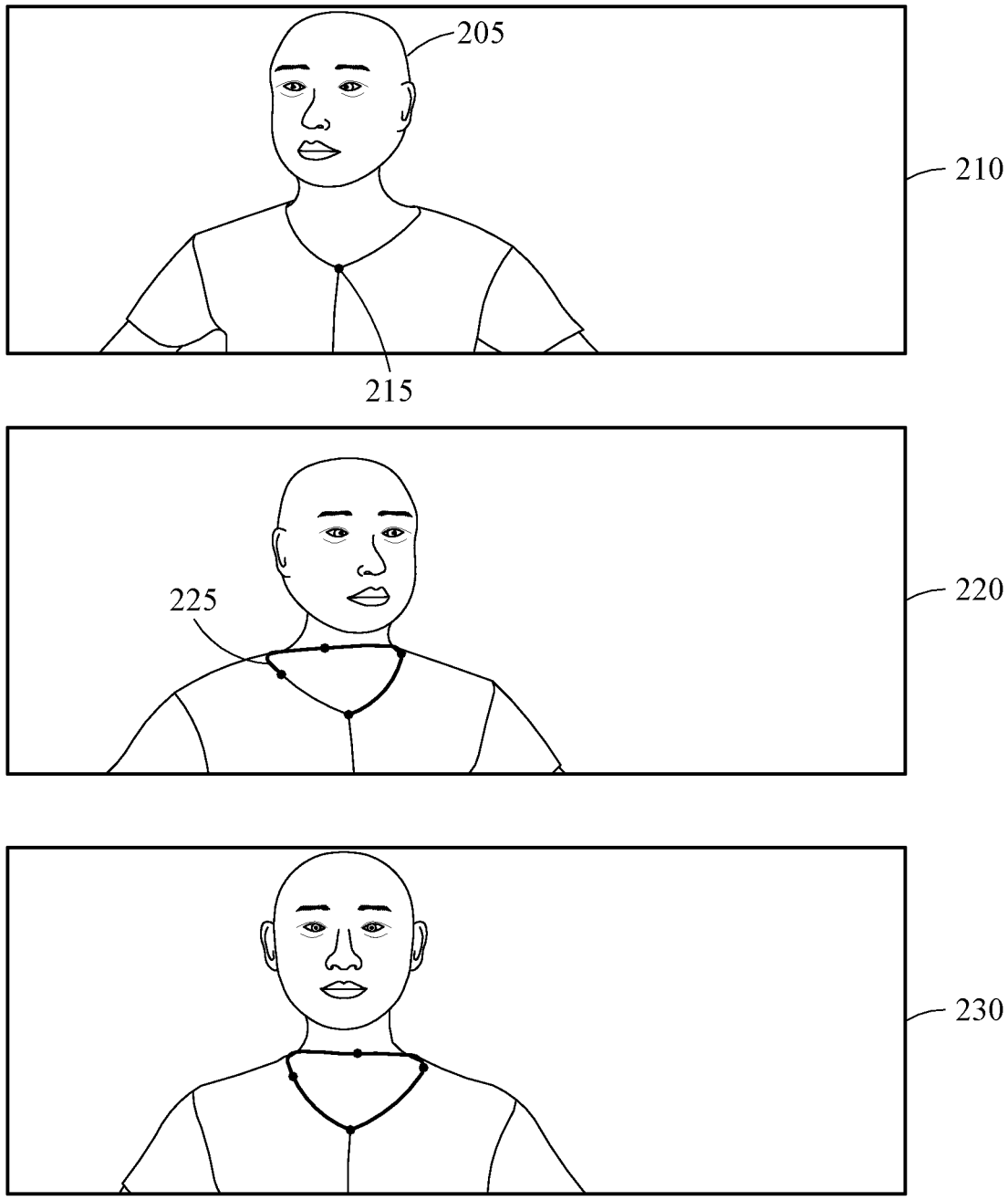
FIGS. 2 and 3 are diagrams for describing a method of receiving a user input for setting a binding region, according to embodiments.

FIG. 2 is a diagram for describing a method of receiving a user input for setting a binding region, according to an embodiment. Referring to FIG. 2, input interface screens 210, 220, and 230 for setting a binding region are illustrated.

As illustrated in the screens 210, 220, and 230, the simulation apparatus according to an embodiment may receive the selection for a binding start point, a binding intermediate point, a binding end point, and/or a binding path in clothes of the 3D avatar model, from the user.

For example, as illustrated in the screen 210, the simulation apparatus may receive the selection for a binding start point 215 in the clothes of the 3D avatar model 205 through various user interfaces; as illustrated in the screen 220, the simulation apparatus may receive the selection for a binding intermediate point 225 connected along the binding path from the binding start point 215. Alternatively, as illustrated in the screen 230, the simulation apparatus may receive the selection for a binding region in which the binding start point 215 being the binding end point is connected along the binding path from the binding start point 215. In this case, the binding may form a closed curve.

Although not illustrated, the binding end point may not be the same as the binding start point. In this case, the binding may form an open curve.

Figure 3:
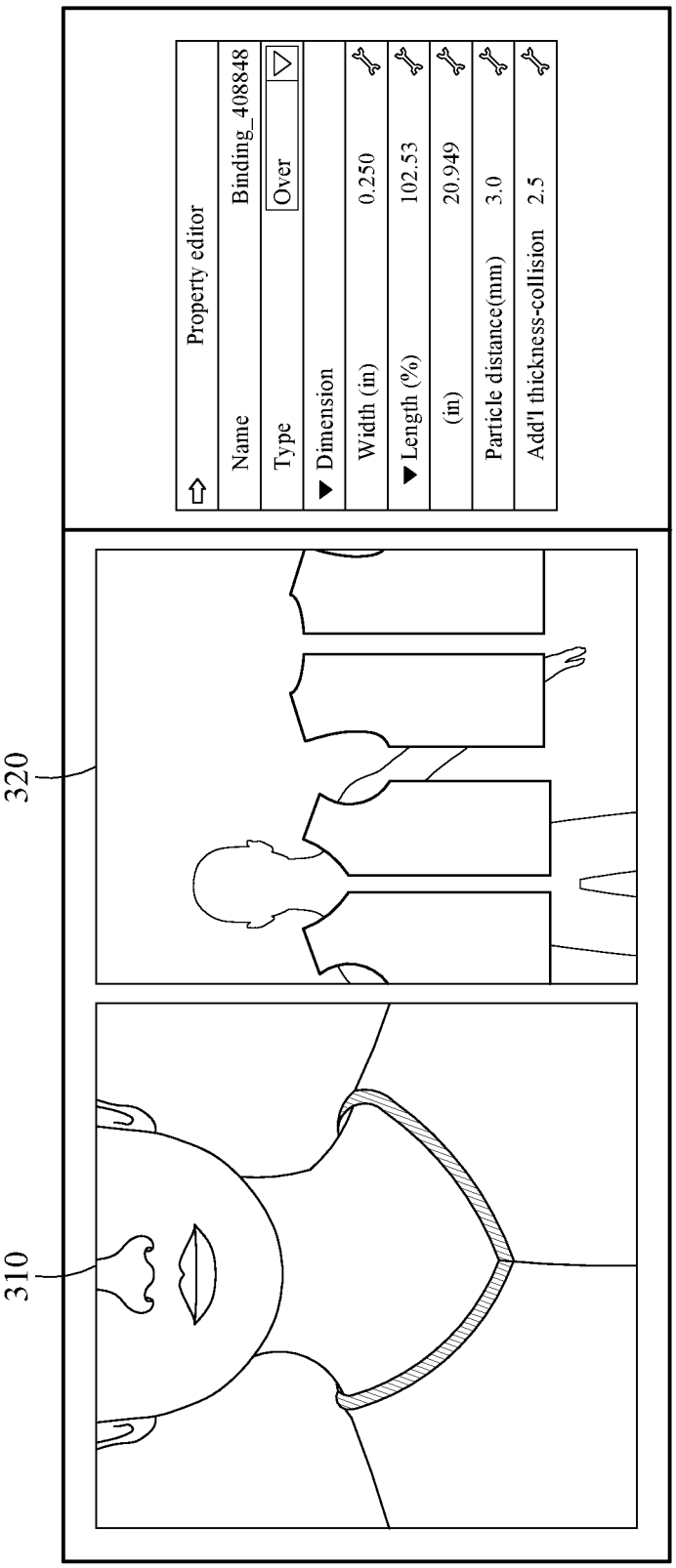

FIG. 3 is a diagram for describing a method of receiving a user input for setting a binding region, according to another embodiment. Referring to FIG. 3, according to an embodiment, a screen 310 that shows clothes, to which a virtual binding pattern is reflected, and a screen 320 that shows base patterns, with which a virtual binding pattern is combined, are illustrated.

As described in FIG. 2, the simulation apparatus may receive a user input to the binding region in base patterns corresponding to the corresponding clothes as illustrated in the screen 320 in a state where a clothes simulation is completed as illustrated in the screen 310, instead of receiving a user selection for the binding region in the clothes in the 3D avatar model.

The simulation apparatus may receive a user's selection for a binding start point, a binding intermediate point, a binding end point, and/or a binding path in base patterns illustrated in the screen 320, through the user interface. When the user's selection for the binding region is made on the base patterns illustrated in the screen 320, the binding region in base patterns is modified depending on the input binding region, and the binding region in clothes simulated on the screen 310 may also be changed depending on the modified binding region.

Figure 6:
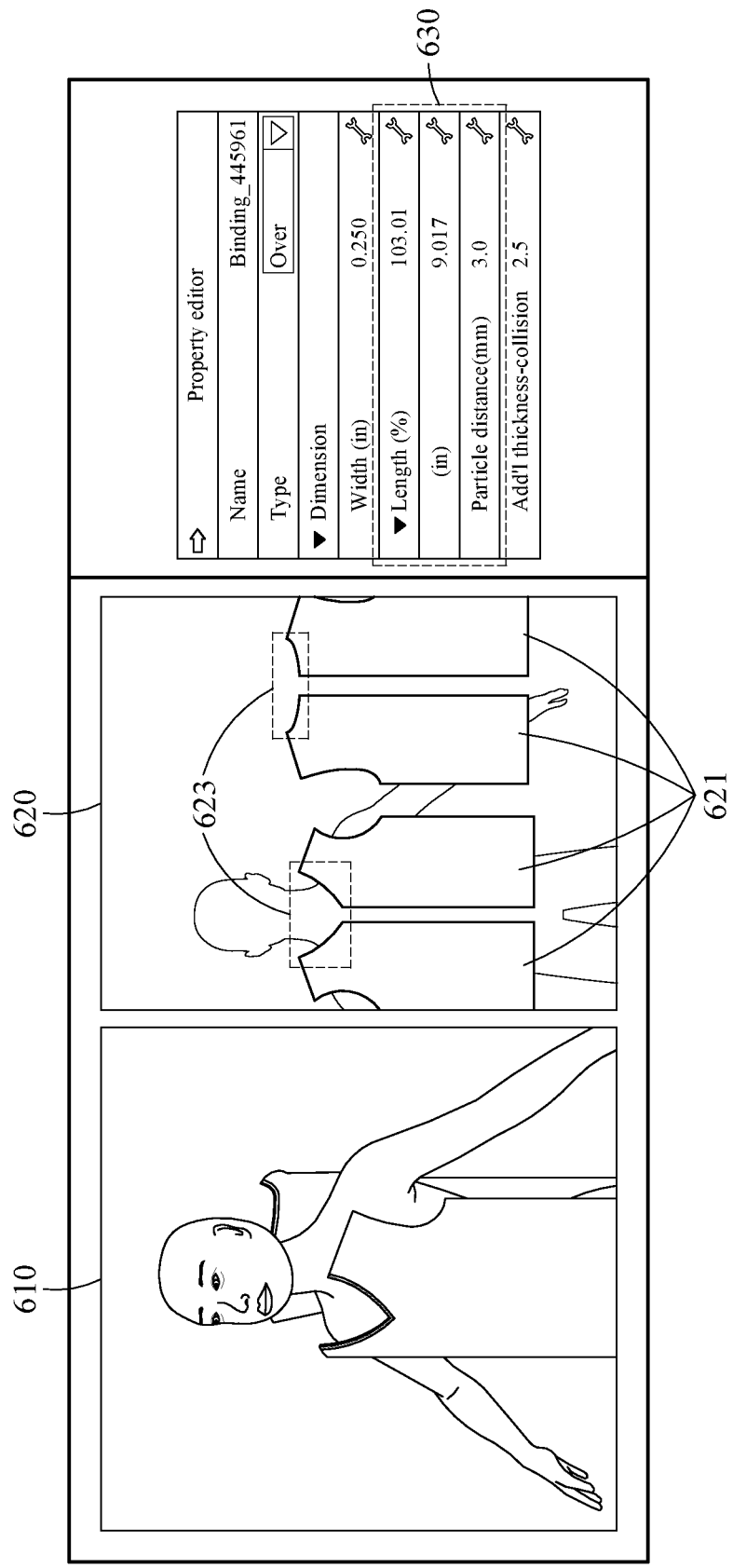
FIG. 6 is a view for describing a method of generating a virtual binding pattern, according to an embodiment.

According to an embodiment, the simulation apparatus may receive the selection for the location, the binding length, the binding width, or the like of the binding region in a state where base patterns are disposed at initial locations on body parts of the 3D avatar model as illustrated in FIG. 6 below.

For example, the initial locations of the base patterns according to an embodiment may be determined by placing arrangement points on bounding volumes depending on the attributes of the bounding volumes for each body part, to which the body type and orientation of the 3D avatar model are reflected, based on the locations of the feature points extracted from the data of the 3D avatar model. A bounding volume described herein refers to a 3D volume (e.g., a cylindrical column) that surrounds various body parts such as hands, feet, elbows, knees, arms, wrists, left or right portions of torso, shoulders, head, neck, legs, left lower body, right lower body and ankles. On some or all bounding volumes, arrangement points may be placed. At this time, for example, the bounding volumes for each body part may be configured in the form of a cylindrical column surrounding body parts of the face, torso, both arms, wrists, both legs, and ankles of the 3D avatar model. For example, the attributes of bounding volumes for each body part may include the length of the cylindrical column, the circumferential length of the cylindrical column, the radial length of the cylindrical column, and the 3D location and orientation of the cylindrical column.

Figure 4:
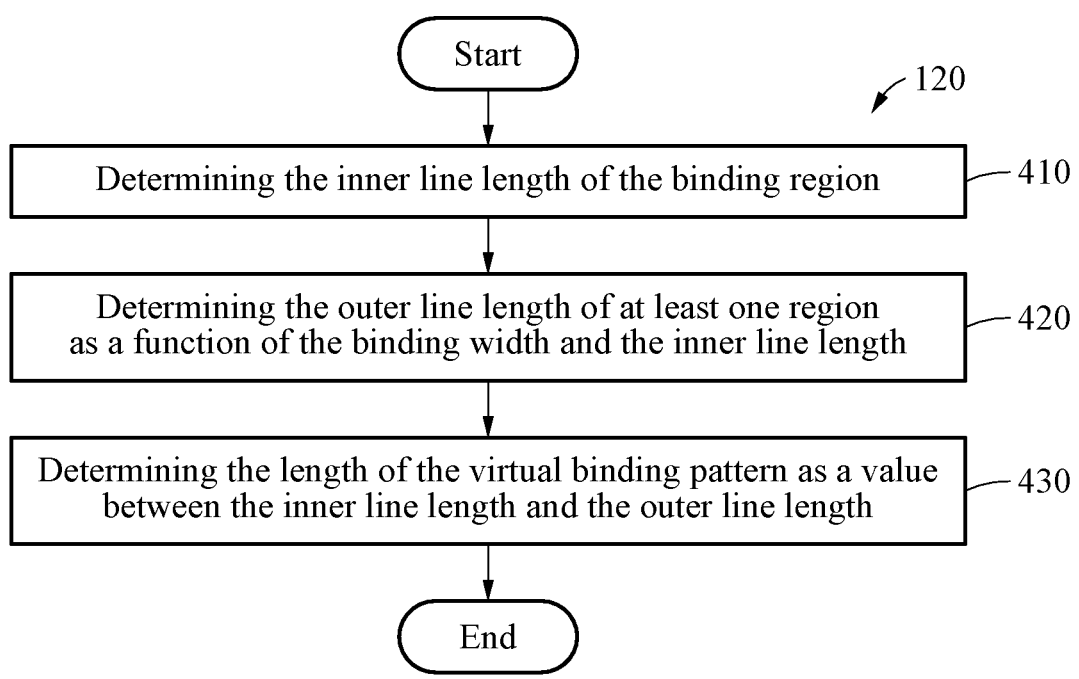
FIG. 4 is a flowchart illustrating a method of calculating a sum of at least one length corresponding to a binding region, according to an embodiment.

FIG. 4 is a flowchart illustrating a method of determining a length of a binding region, according to an embodiment. Referring to FIG. 4, the simulation apparatus according to an embodiment may determine 410 the inner line length of the binding region.

The simulation apparatus may determine 420 the outer line length of at least one region as a function of the binding width and the inner line length. For example, the outer line length may correspond to a sum of the binding width multiplied with a number and the inner line length multiplied by another number. At this time, the binding width may be determined, for example, by the user setting.

The simulation apparatus may determine 430 the length of the virtual binding pattern as a value between the inner line length and the outer line length.

The binding may be performed in the form of attaching a rectangular fabric of which the perimeter length of a curved region (e.g., a neckline of a clothes, the line of a sleeve) is long. Accordingly, the inner line length and the outer line length of the binding region to which the virtual binding pattern is applied may be different from each other. In the base pattern, the "inner line" of the region to which a virtual binding pattern is applied may refer to, for example, the inside of the curved region, in other words, the boundary of the region close to the base pattern; the "outer line" may refer to, for example, the outside of the curved region, in other words, the boundary of the region close to the virtual binding pattern. In an embodiment, for example, in the base pattern, the average value of the inner line length and the outer line length may be determined as the length of the virtual binding pattern. The sewing line for sewing the virtual binding pattern to the base pattern may be determined depending on the determined length of the virtual binding pattern.

The attributes of the virtual binding pattern may include, among others, width of the binding pattern and binding length ratio. The width of the binding pattern refers to a dimension of the binding pattern in a direction perpendicular to a length along which the binding pattern extends. The binding length ratio refers to a ratio between a length of the virtual binding pattern and a length of the base pattern. If the binding length ratio is less than 100%, wrinkles may be formed in the area where the virtual binding pattern is attached to the base pattern due to the different in the lengths. The binding width included in the attributes of the virtual binding pattern may also be set by a user.

When the binding width is set, the simulation apparatus may determine the length of the virtual binding pattern further in consideration of the binding width. That is, the length of the virtual binding pattern may be increased as the binding width is increased whereas the length of the virtual binding pattern may be decreased as the binding width is decreased. The difference between the length of the inner line and the length of the outer line may also vary depending on the binding width. For example, as the binding width increases, the length of the outer line may increase when the length of the inner line remains fixed. The length of the virtual binding pattern is determined as a function of the length of the inner line and the length of the outer line. For example, the length of the virtual binding pattern may be determined as the average of the length of the inner line and the length of the outer line. The length of the virtual binding pattern may vary depending on the binding width.

Setting of the binding pattern according to the binding length and width set by the user is described below with reference to FIG. 6 below.

Figure 5:
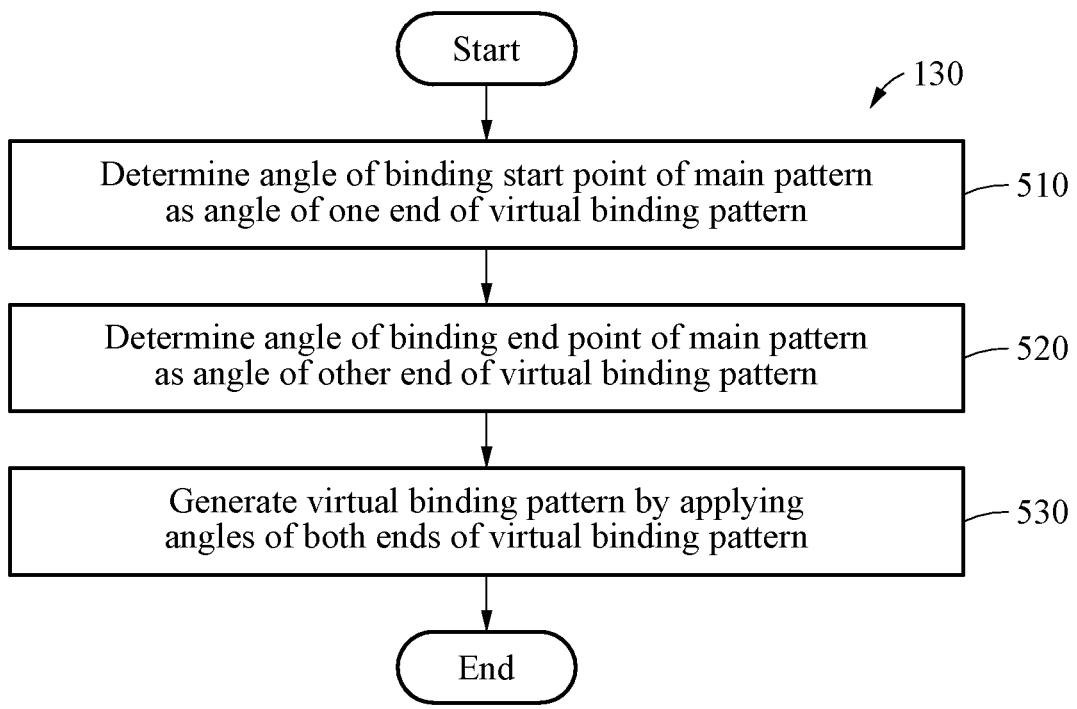
FIG. 5 is a flowchart illustrating a method of generating a virtual binding pattern, according to an embodiment.

FIG. 5 is a flowchart illustrating a method of generating a virtual binding pattern, according to an embodiment. Referring to FIG. 5, the simulation apparatus according to an embodiment may determine 510 the angle of the binding start point of the base pattern as the angle of one end of the virtual binding pattern.

The simulation apparatus may determine 520 the angle of the binding end point of the base pattern as the angle of the other end of the virtual binding pattern.

The simulation apparatus may generate 530 a virtual binding pattern by applying the two determined angles to both ends of the virtual binding pattern.

For example, when the clothes to be manufactured are round neck shirts and when the binding region is set to the neck region of clothes, the angle of the binding start point and end point of the base pattern corresponding to the neck may be 90 degrees. In this case, the angle of one end and the other end of the virtual binding pattern may be determined to 90 degrees. On the other hand, when the clothes to be manufactured are V-neck shirts and when the binding region is set to the neck region of clothes, the angle of the binding start point and end point of the base pattern corresponding to the neck may be 45 degrees. In this case, the angle of one end and the other end of the virtual binding pattern may be determined to 45 degrees.

As such, the angle of both ends of the virtual binding pattern may vary depending on the shape or form of the binding region of the base pattern of the clothes to be manufactured.

FIG. 6 is a view for describing a method of generating a virtual binding pattern, according to an embodiment. Referring to FIG. 6, according to an embodiment, a screen 610 in which base patterns are disposed on a 3D avatar model, a screen 620 illustrating base patterns 621, and a user interface screen 630 for setting a binding length and a binding width of a binding pattern are illustrated.

The simulation apparatus may allow a user to modify the line of the base pattern even after the virtual binding pattern is generated through the above-described process. At this time, the user may edit the inner line and/or outer line of the binding region of the base pattern. The user may modify the binding length and/or may modify binding width by adjusting the binding length ratio of the dotted line region illustrated in the user interface screen 630. The simulation apparatus may determine a modified length of the binding region, in response to the modification of the base pattern and may modify the virtual binding pattern based on the modified length.

For example, when the user edits the binding length and binding width of the binding pattern on the user interface screen 630 as illustrated in a part displayed using the dotted line, a binding line 623 is generated in the neck portion of the 2D base patterns 621 illustrated in the screen 620 and the binding region in the base patterns illustrated in the screen 610 may also be modified in accordance with the binding line 623 on the 2D base patterns 621.

The simulation apparatus may initially place a triangular mesh of a band pattern contacting the line along the line of the 3D binding region of the base patterns illustrated in the screen 610 in accordance with the binding line 623 on the 2D base patterns 621 and may update the binding pattern by placing the meshes gradually away from the line.

According to an embodiment, the binding type may be set by the user. The binding type may include an out-binding type and an in-binding type. In the embodiment of FIG. 6, the binding type may be set to "over" corresponding to the out-binding type. In this case, the binding may be exposed to the outside of clothes on the simulation.

Figure 7:
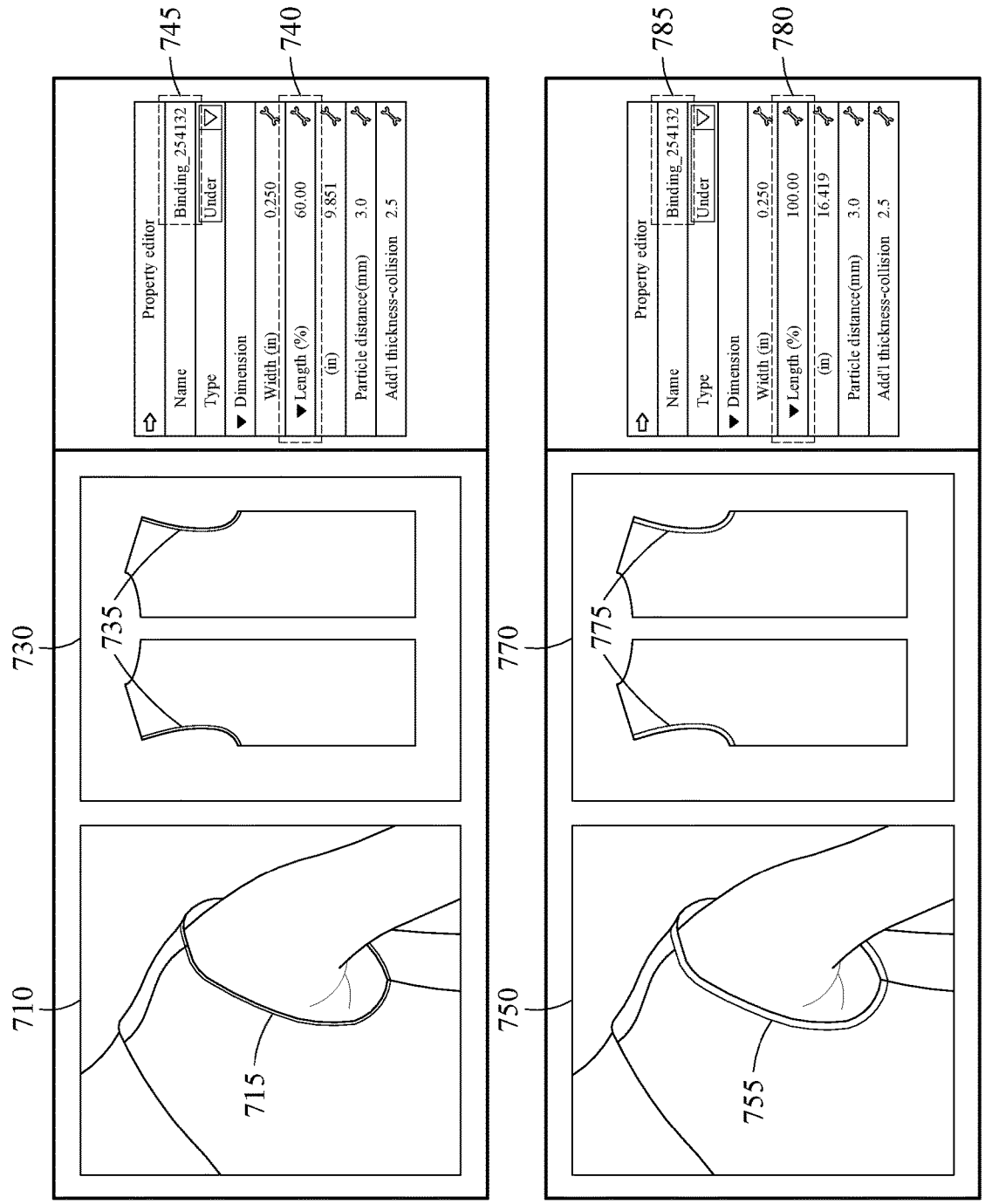
FIG. 7 is a view for describing a method of adjusting a binding width and binding length ratio, according to an embodiment.

FIG. 7 is a view for describing a method of adjusting a binding length ratio, according to an embodiment. Referring to FIG. 7, according to an embodiment, screens 710 and 750 illustrating the result of adjusting the binding width and binding length ratio for the sleeve portion through the user interface screens are illustrated.

The simulation apparatus may determine the length of the virtual binding pattern as a function of the binding length ratio included in the attribute of the virtual binding pattern. For example, when the binding region is selected as the sleeve portion of the clothes and the binding length ratio is set to 60%, as illustrated in a screen 740, the simulation apparatus may generate a virtual binding pattern at a length ratio of 60% of the length of the virtual binding pattern determined through the process of FIG. 4 and may reflect the virtual binding pattern to the binding region 735 of the sleeve of the base pattern illustrated on a screen 730. As the length ratio of 60% is reflected to the binding region 735 of the sleeve of the base pattern, the length ratio of 60% may be also reflected on the sleeve binding region 715 of the clothes illustrated on the screen 710 such that puckering may be formed on the sleeve portion.

Alternatively, as illustrated in 780, when a binding length ratio is set to 100%, the simulation apparatus may generate a virtual binding pattern at a length ratio of 100% of the length of the virtual binding pattern determined through the process of FIG. 4 and may reflect the virtual binding pattern to the binding region 775 of the sleeve of the base pattern illustrated on a screen 770. As the length ratio of 100% is reflected in the binding region 775 of the sleeve of the base pattern, the length ratio of 100% may be also reflected in the sleeve binding region 755 of the clothes illustrated on the screen 750 such that the sleeve portion may become flat.

According to an embodiment, the simulation apparatus may determine the length of the virtual binding pattern further in consideration of the binding width in addition to the binding length ratio.

According to an embodiment, for example, the simulation apparatus may receive the user's settings for the binding attribute such as a visual property corresponding to a virtual binding pattern, the physical property of the virtual binding pattern, the direction of a grain line, a binding length ratio, a binding type, a binding width, and the like. The simulation apparatus may combine the base pattern by reflecting the set value to the virtual binding pattern.

According to an embodiment, the pattern or the virtual binding pattern may be expressed as fabric. The fabric may be expressed as the combination of the visual property and the physical property. For example, the visual property may include a texture, a color, the degree of sparkle on a surface, and/or matt information expressed by graphics or images. According to an embodiment, the texture may be represented by a texture-normal map; the colors may be represented as a base color map. According to an embodiment, because the two properties (visual and physical properties) of the fabric are applied together to the virtual binding pattern, various visual properties may be expressed in addition to the texture.

Herein, for example, the "physical property" may include stretch weft, stretch warp, shear, bending intensity, buckling ratio, buckling ratio intensity, internal damping, density, friction coefficient, or the like. Each of the physical property may affect each other; the values of all physical properties may be mixed and expressed in the binding pattern.

For example, internal damping indicates the degree of repulsive power to the speed at which clothes increase or decrease when the clothes are slopping. When the internal damping value is high, the binding pattern will move slowly as if the binding pattern is in water. When the internal damping value is low, the binding pattern moves quickly. The density may indicate the weight of the binding pattern per unit area; as the density increases, the binding pattern may be heavier. The friction coefficient is used to adjust the frictional force of the binding pattern. The frictional force may affect the friction between the binding pattern and the base pattern, as well as the friction with the 3D avatar model.

The binding pattern is weaved with weft and warp; the vertical direction is called lengthwise grain, and the horizontal direction is called crosswise grain, and the diagonal direction is called bias grain. The stretch weft refers to the crosswise grain of the pattern, that is, the amount of stretching in the horizontal direction. In other words, the stretch weft refers to the strength of the repulsive force for stretching in the horizontal direction; as the setting value of the stretch weft decreases, it is possible to stretch well in the horizontal direction. The stretch warp refers to the lengthwise grain of the pattern, that is, the amount of stretching in the vertical direction. In other words, the stretch warp refers to the strength of the repulsive force for stretching in the vertical direction; as the setting value of the stretch warp decreases, it is possible to stretch well in the vertical direction.

The shear refers to the bias of the pattern, that is, the amount of stretching in the diagonal direction. In other words, the shear refers to the strength of the repulsive force for stretching in the diagonal direction. As the setting value of the bias intensity decreases, it is possible to stretch well in the diagonal direction. When the shear is set to the same ratio as the stretch weft and the stretch warp, it is possible to express wrinkle-like materials such as cotton or denim. When the bias intensity is set to be lower than the stretch weft and stretch warp, it is possible to express an elastic material like jersey or silk. For example, when three or more binding patterns are synthesized, the stretch weft of the synthesized region may be calculated through the sum of the stretch weft of each pattern. Moreover, when "n" patterns having the same physical property are synthesized, the shear of the synthesized region may be calculated as the shear of n3* pattern.

The bending intensity refers to the degree of stiffness of the pattern, that is, the degree of hardness and firmness. As the bending intensity is higher, the pattern is not bended well. The bending intensity may include bending weft and bending warp. The bending weft refers to the degree of hardness and firmness in the horizontal direction; the bending warp refers to the degree of hardness and firmness in the vertical direction. When the value of bending intensity is high, it is possible to express a stiff material such as denim or leather; when the value of bending intensity is low, it is possible to express a draped material like silk.

Furthermore, the simulation apparatus may assign a stitch attribute to a binding region. "Stitch" is a general term indicating various types of stiches. The stitching may be performed by embroidery, knitting, sewing, or the like, embroidering once, sewing once, knitting once, whipstitching once, or the like. The stitch refers to a needle of a seam formed while the above-described patterns overlap with one another.

The attribute contents of the stitch selected from the attribute information group composed of a type of stitch, a location (a front surface or rear surface), a number, a material, puckering, and seam allowance may be received. For example, the location of the stitch may be the front surface or rear surface of the base pattern or the front surface or rear surface of the binding pattern. One of the various types of stitches described above may be selected and then the selected type of stitch may be visualized on the front surface and rear surface of the fabric. When one surface of the front surface and rear surface of clothes is selected and then it is possible to visualize a stitch on the selected surface and when the stitch is visualized on both the front surface and rear surface of the clothes, it may be possible to visualize different types of stitches or the same kind of stitches.

In one embodiment, it is also possible to set puckering capable of being generated by sewing the actual fabric. When there are a plurality of stitches, it is possible to set where the puckering is formed among the plurality of stitches, or the like.

According to an embodiment, the binding type may be set. The binding type may include an out-binding type and an in-binding type. In the embodiment of FIG. 7, the binding type may be set to "under" corresponding to the in-binding type. In this case, the binding may be concealed inside the clothes on the simulation.

Figure 8:
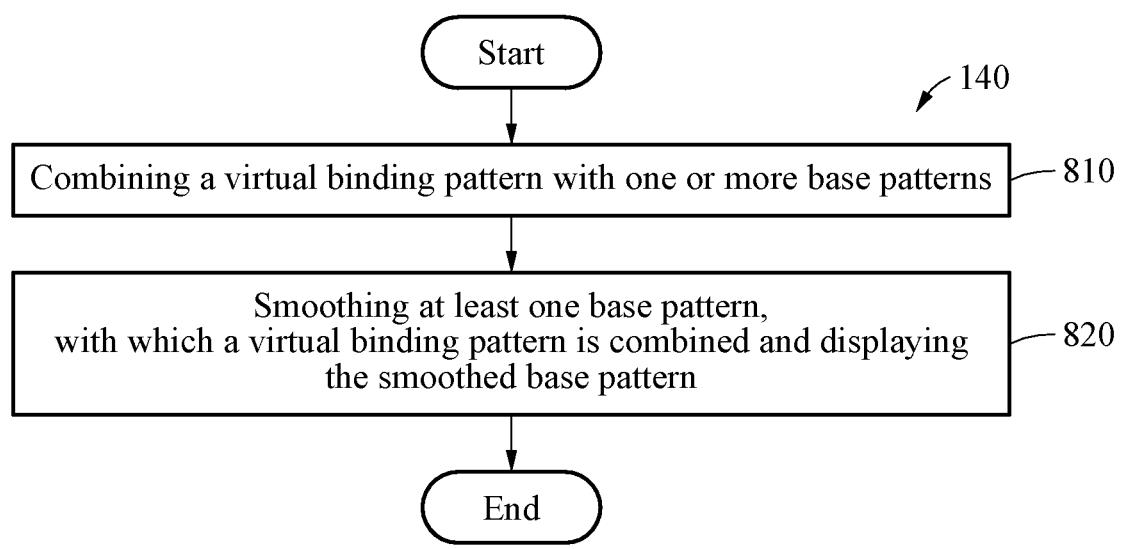
FIG. 8 is a flowchart illustrating a method of draping clothes to a 3D avatar model, according to an embodiment.

FIG. 8 is a flowchart illustrating a method of draping clothes to a 3D avatar model, according to an embodiment. Referring to FIG. 8, the simulation apparatus according to an embodiment may combine 810 a virtual binding pattern with one or more base patterns. Combining the virtual binding pattern with the base pattern refers to attaching the virtual binding pattern and the base pattern.

Figure 9:
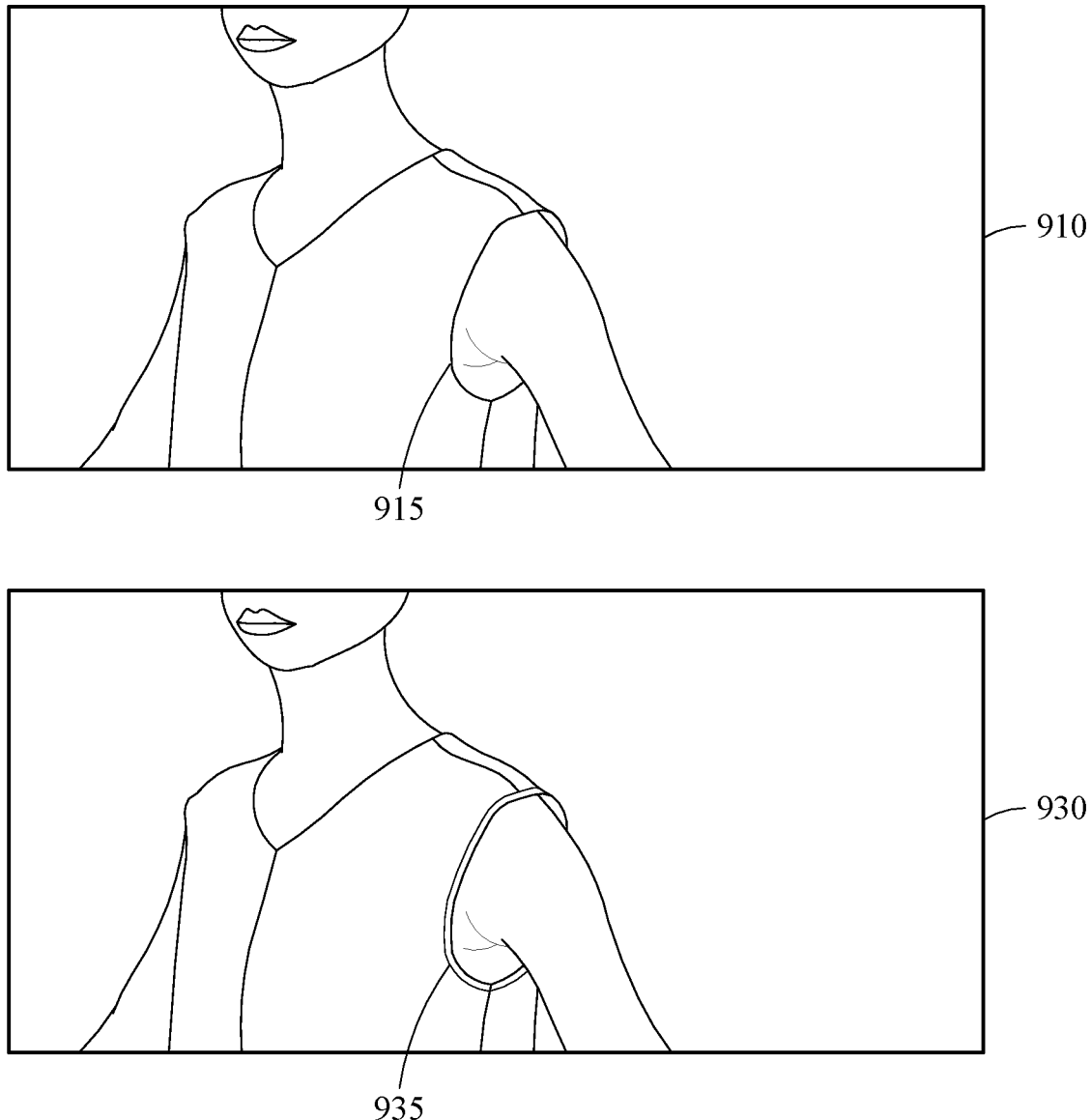
FIG. 9 is a view illustrating an image in which clothes are draped before and after binding is reflected to a 3D avatar model, according to an embodiment.
Figure 10:
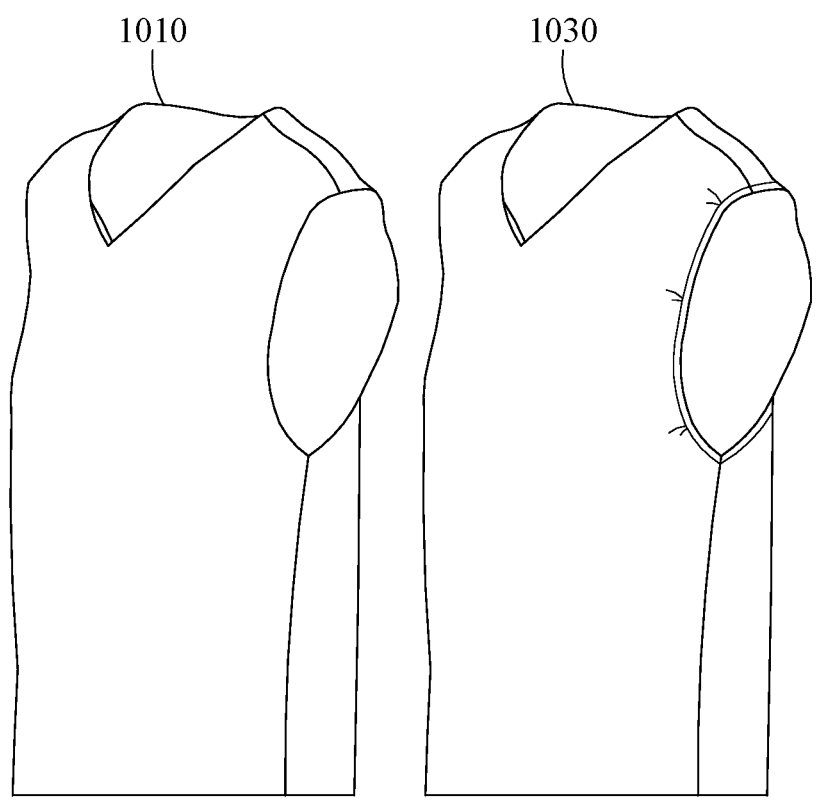
FIG. 10 is a view illustrating clothes before and after binding is reflected, according to an embodiment.

The simulation apparatus may smooth 820 at least one base pattern, with which a virtual binding pattern is combined, for example, ironing out flatly, and then may display 820 the smoothed base pattern as illustrated in FIGS. 9 and 10 below. The main pattern combined with the virtual binding pattern is draped onto the 3D avatar model through iteration computations so there is no collision between the polygons of the combined pattern and with the polygons of the 3D avatar model. In the initial iteration, the initial positions of portion of the clothes are determined by having a portion of clothes corresponding to a body part of the 3D avatar model roughly surround a bounding volume.

The simulation apparatus may calculate acceleration applied to the plurality of polygons in their initial positions by simultaneously considering the force and Jacobian applied to the polygons of the clothes. For example, after defining a system of equations corresponding to a plurality of polygons as a linear system, the simulation apparatus may solve the corresponding linear system to calculate accelerations of a plurality of polygons of the clothes. Then, the simulation apparatus may calculate velocities and positions of the polygons from the accelerations of the polygons derived from the force and Jacobian applied to the polygons of the clothes. The force applied to the polygons include internal force caused by sewing or the physical properties of the clothes (e.g., contracting or to unfolding force) and external force such as gravity. Additional force may be added as external force to prevent a collision between the polygons of clothes or between the polygons of the clothes and the polygons of the 3D avatar model.

Although the linear system calculation is performed in a manner so that the collisions between polygons of the clothes or collisions between the polygons of the clothes and polygons of the 3D avatar model are reduced, collisions may nevertheless occur. The simulation apparatus handles such collisions separately, and the positions and velocities of polygons without collisions can be provided to the next iteration.

The draping simulation apparatus may simulate the draping of the clothes on the avatar by repeating the above-described iteration until predefined conditions are met.

FIG. 9 is a view illustrating an image in which clothes are draped before and after binding is reflected to a 3D avatar model, according to an embodiment. Referring to FIG. 9, a screen 910 in which clothes are draped to a 3D avatar model before binding is reflected to a binding region 915 and a screen 930 in which clothes are draped to the 3D avatar model after the binding is reflected to a binding region 935 are illustrated.

For example, as illustrated in the screen 930, when the clothes to which the binding is reflected are simulated three-dimensionally, it is assumed that a user changes the shape of the binding pattern through a user interface. In this case, in 3D simulation, binding deformation may be reflected at the same time. The simulation apparatus may also reflect the draping form of the base pattern, in other words, the draping type such as puckering, wrinkling, or the like of the base pattern, to the binding.

FIG. 10 is a view illustrating clothes before and after binding is reflected, according to an embodiment. Referring to FIG. 10, after clothes are draped to a 3D avatar model through the above-described process, the simulation apparatus according to an embodiment may output clothes 1010 before binding is reflected finally and/or clothes 1030 after the binding is reflected.

It may be seen that the clothes 1010, to which the binding is not reflected, are stretched sleeves and the sleeve part of the clothes 1030, to which the binding is reflected, is reinforced to generate puckering.

Figure 11:
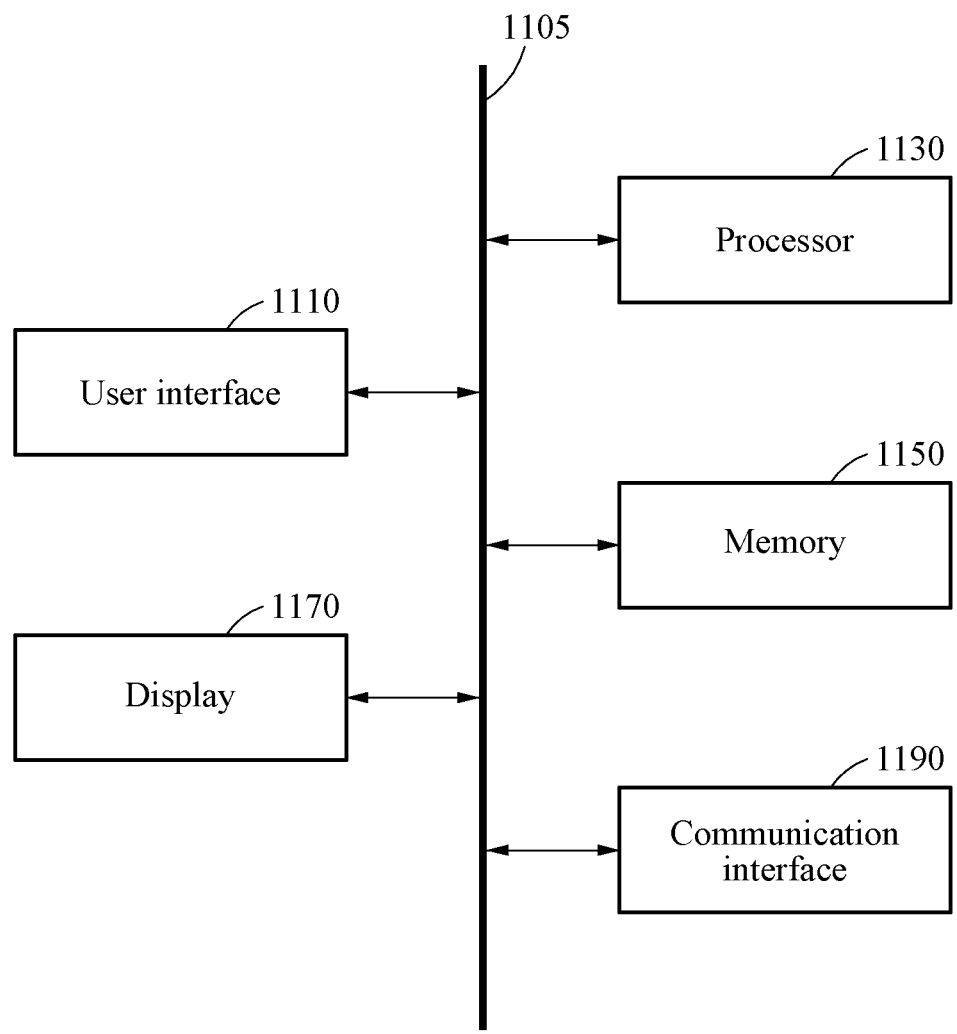
FIG. 11 is a block diagram of an apparel simulation apparatus reflecting a binding, according to an embodiment.

FIG. 11 is a block diagram of an apparel simulation apparatus reflecting a binding, according to an embodiment. Referring to FIG. 11, an apparel simulation apparatus ("simulation apparatus") 1100 reflecting a binding according to an embodiment includes a user interface 1110, a processor 1130, and a display 1170. The simulation apparatus 1100 may further include a memory 1150, and a communication interface 1190. The user interface 1110, the processor 1130, the memory 1150, the display 1170, and the communication interface 1190 may communicate with each other via a communication bus 1105.

The user interface 1110 receives a user input for setting a binding region in clothes draped to a 3D avatar model. For example, the user interface may include a touch input or the like through a stylus pen, a mouse, a keyboard, or a touch interface, but may not be limited thereto.

The processor 1130 calculates the sum of at least one length corresponding to the binding region in at least one base pattern constituting clothes, based on the user input received through the user interface 1110. The processor 1130 generates a virtual binding pattern coupled with the at least one base pattern, based on the sum of the at least one length. The processor 1130 drapes clothes to the 3D avatar model, based on the at least one base pattern and the virtual binding pattern.

The processor 1130 may determine the length of the virtual binding pattern, further in consideration of the binding width included in the attribute of the virtual binding pattern. Furthermore, the processor 1130 may determine the length of the virtual binding pattern, further in consideration of the binding length ratio included in the attribute of the virtual binding pattern.

For example, the processor 1130 may determine that the angle of the binding start point of the base pattern is the angle of one end of the virtual binding pattern and may determine that the angle of the binding end point of the base pattern is the angle of the other end of the virtual binding pattern. The processor 1130 may generate a virtual binding pattern by applying angles of both ends of the virtual binding pattern.

The processor 1130 may calculate a length ratio between at least one or more lengths corresponding to the binding region in at least one base pattern. The processor 1130 may match the virtual binding pattern with the at least one base pattern based on the binding start point of the base pattern so as to be suitable for the length ratio.

The memory 1150 may store coordinates corresponding to the user input received through the user interface 1110. The memory 1150 may store the sum of at least one length corresponding to the binding region calculated by the processor 1130. The memory 1150 may store an image of the 3D avatar model to which a virtual binding pattern and/or clothes generated by the processor 1130 is draped. The memory 1150 may be a volatile memory or a nonvolatile memory.

The display 1170 may display the 3D avatar model to which the clothes generated by the processor 1130 are draped.

The communication interface 1190 may output the image of the 3D avatar model to which the clothes generated by the processor 1130 are draped.

In addition, the processor 1130 may perform the at least one method described above with reference to FIGS. 1 to 10 or an algorithm corresponding to at least one method. The processor 1130 may execute the program and may control the simulation apparatus 1100. The program code executed by the processor 1130 may be stored in the memory 1150. For example, the processor 1130 may be implemented with a Central Processing Unit (CPU), a Graphics Processing Unit (GPU), or a Neural network Processing Unit (NPU).

According to an aspect, even though a user does not separately produce a binding pattern based on a user input for setting the binding region in clothes draped to the 3D avatar model, the binding may be automatically implemented on virtual clothes, thereby increasing the convenience of a user.

According to an aspect, it is possible to provide the result image in which clothes to which the binding is reflected is draped to the 3D avatar model, by generating a virtual binding pattern based on a user input for setting a binding region to combine the virtual binding pattern with a base pattern.

According to an aspect, it is possible to provide virtual clothes simulation as similar as possible, by reflecting the binding attribute received by the user settings and the attribute such as the reinforcement by the binding, a physical property for the binding itself, stitch, or the like.

The methods according to the above-described embodiment of the present invention may be implemented as program commands capable of being performed through various computer means and may be recorded in computer-readable media. The computer-readable medium may also include the program instructions, data files, data structures, or a combination thereof. The program instructions recorded in the media may be designed and configured specially for the exemplary embodiments of the present invention or be known and available to those skilled in computer software. The computer-readable medium may include a hardware system, which is specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories. Examples of computer instructions include not only machine language codes created by a compiler, but also high-level language codes that are capable of being executed by a computer by using an interpreter or the like. The described hardware devices may be configured to act as one or more software modules to perform the operations of the above-described exemplary embodiments of the present invention, or vice versa.

Software may include computer programs, codes, instructions or one or more combinations thereof and configure a processing unit to operate in a desired manner or independently or collectively control the processing unit. The software and/or data may be permanently or temporarily embodied in any type of machine, components, a physical system, a virtual system (virtual equipment), computer storage media, or systems so as to be interpreted by the processing system or to provide instructions or data to the processing system. Software may be dispersed throughout computer systems connected via networks and be stored or executed in a dispersion manner. Software and data may be recorded in one or more computer-readable storage media.

Even though the embodiments are described with reference to restricted drawings, it may be obvious to one skilled in the art that the embodiments are variously changed or modified based on the above description. For example, adequate effects may be achieved even if the foregoing processes and methods are carried out in different order than described above, and/or the aforementioned elements, such as systems, structures, systems, or circuits, are combined or coupled in different forms and modes than as described above or be substituted or switched with other components or equivalents.

Therefore, other implementations, other embodiments, and equivalents to claims are within the scope of the following claims.

What is claimed is:

1. A method of simulating apparel, the method comprising:
   receiving a user input for setting a binding region of the apparel draped to a three-dimensional (3D) avatar model;
   generating a virtual two-dimensional (2D) binding pattern combined with one or more two-dimensional (2D) base pattern constituting the apparel, based on the binding region, wherein the virtual 2D binding pattern is supplemental material or seam for reinforcing stiffness of the one or more 2D base pattern; and
   draping the apparel onto the three-dimensional (3D) avatar model by combining at least one of the one or more 2D base pattern and the virtual 2D binding pattern based on at least one binding attribute of the virtual 2D binding pattern.

2. The method of claim 1, wherein the user input indicates a binding start point, a binding end point, and a binding path of the binding region.

3. The method of claim 1, wherein generating the virtual 2D binding pattern comprises:
   receiving a ratio of a length of the binding region of the virtual 2D binding pattern;
   determining a pattern length of the virtual 2D binding pattern in consideration of the ratio.

4. The method of claim 1, wherein generating the virtual 2D binding pattern comprises:
   receiving a binding width of the virtual 2D binding pattern; and
   determining a pattern length of the virtual 2D binding pattern in consideration of the binding width.

5. The method of claim 4, wherein determining the pattern length of the virtual 2D binding region comprises:
   calculating an inner line length of the virtual 2D binding region in the binding area;
   calculating an outer line length of the virtual 2D binding region, in consideration of the inner line length and the binding width; and
   determining the length of the virtual 2D binding pattern between the inner line length and the outer line length.

6. The method of claim 1, wherein generating the virtual 2D binding pattern comprises:
   determining an angle of a binding start point of the one or more 2D base pattern as a first angle of one end of the virtual 2D binding pattern;
   determining an angle of a binding end point of the one or more 2D base pattern as a second angle of another end of the virtual 2D binding pattern; and
   applying the first angle and the second angle to generate the virtual 2D binding pattern.

7. The method of claim 1, wherein generating the virtual 2D binding pattern comprises:
   calculating a length ratio between at least one length corresponding to the binding region in the one or more 2D base pattern; and
   matching the virtual 2D binding pattern with the one or more 2D base pattern according to the length ratio based on a starting point of the 2D base pattern.

8. The method of claim 1, further comprising:
   receiving a user input defining at least one binding attribute, wherein the at least one binding attribute is a visual property corresponding to the virtual 2D binding pattern a physical property of the virtual 2D binding pattern a direction of a grain line, a binding length ratio, a binding width, or a binding type, wherein the virtual 2D binding pattern is attached to the one or more base pattern according to the at least one binding attribute.

9. The method of claim 1, wherein the at least one binding attribute comprises a stitch attribute to the binding region.

10. The method of claim 1, further comprising:
    receiving a modification of the one or more 2D base pattern;
    modifying the binding region according to the modification; and
    modifying the virtual 2D binding pattern based on the modified binding area.

11. A non-transitory computer-readable storage medium storing instructions, the instructions when executed by a processor cause the processor to:
    receive a user input for setting a binding region of apparel draped to a three-dimensional (3D) avatar model;
    generate a virtual two-dimensional (2D) binding pattern combined with one or more two-dimensional (2D) base pattern constituting the apparel, based on the binding region, wherein the virtual 2D binding pattern is supplemental material or seam for reinforcing stiffness of the one or more 2D base pattern; and drape the apparel onto the three-dimensional (3D) avatar model by combining at least one of the one or more 2D base pattern and the virtual 2D binding pattern based on a at least one binding attribute of the virtual 2D binding pattern.

12. An apparatus for simulating apparel, the apparatus comprising:
   a user interface to receive a user input for setting a binding region of the apparel draped to a 3D avatar model;
   a processor; and
   a memory coupled to the processor, the memory storing instructions thereon, the instructions when executed by the processor cause the processor to:
      generate a virtual two-dimensional (2D) binding pattern combined with one or more two-dimensional (2D) base pattern constituting the apparel, based on the binding region, wherein the virtual 2D binding pattern is supplemental material or seam for reinforcing stiffness of the one or more 2D base pattern; and
      drape the apparel onto the 3D avatar model by combining at least one of the one or more 2D base pattern and the virtual 2D binding pattern based on a at least one binding attribute of the virtual 2D binding pattern.

13. The apparatus of claim 12, wherein the processor receives a binding width of the virtual 2D binding pattern and determines a pattern length of the virtual 2D binding pattern in consideration of the binding width.

14. The apparatus of claim 12, wherein the processor receives a ratio of a length of the binding region of the virtual 2D binding pattern and determines a pattern length of the virtual 2D binding pattern in consideration of the ratio.

15. The apparatus of claim 12, wherein the processor determines an angle of a binding start point of the one or more 2D base pattern as a first angle of one end of the virtual 2D binding pattern, determines an angle of a binding end point of the one or more 2D base pattern as a second angle of another end of the virtual 2D binding pattern and applies the first angle and the second angle to generate the virtual 2D binding pattern.

16. The apparatus of claim 12, wherein the processor calculates a length ratio between at least one length corresponding to the binding region in the one or more 2D base pattern and matches the virtual 2D binding pattern with the one or more 2D base pattern according to the length ratio based on a starting point of the 2D base pattern.

17. The apparatus of claim 12, wherein the processor receives a modification of the one or more 2D base pattern, modifies the binding region according to the modification and modifies the virtual 2D binding pattern based on the modified binding area.

18. The apparatus of claim 12, further comprising:
   a display to display the 3D avatar model to which the apparel is draped.

* * * * *